J. LINDBERG.
ADJUSTABLE COMBINATION CANDY CUTTER.
APPLICATION FILED MAR. 25, 1908.
912,006.
Patented Feb. 9, 1909.
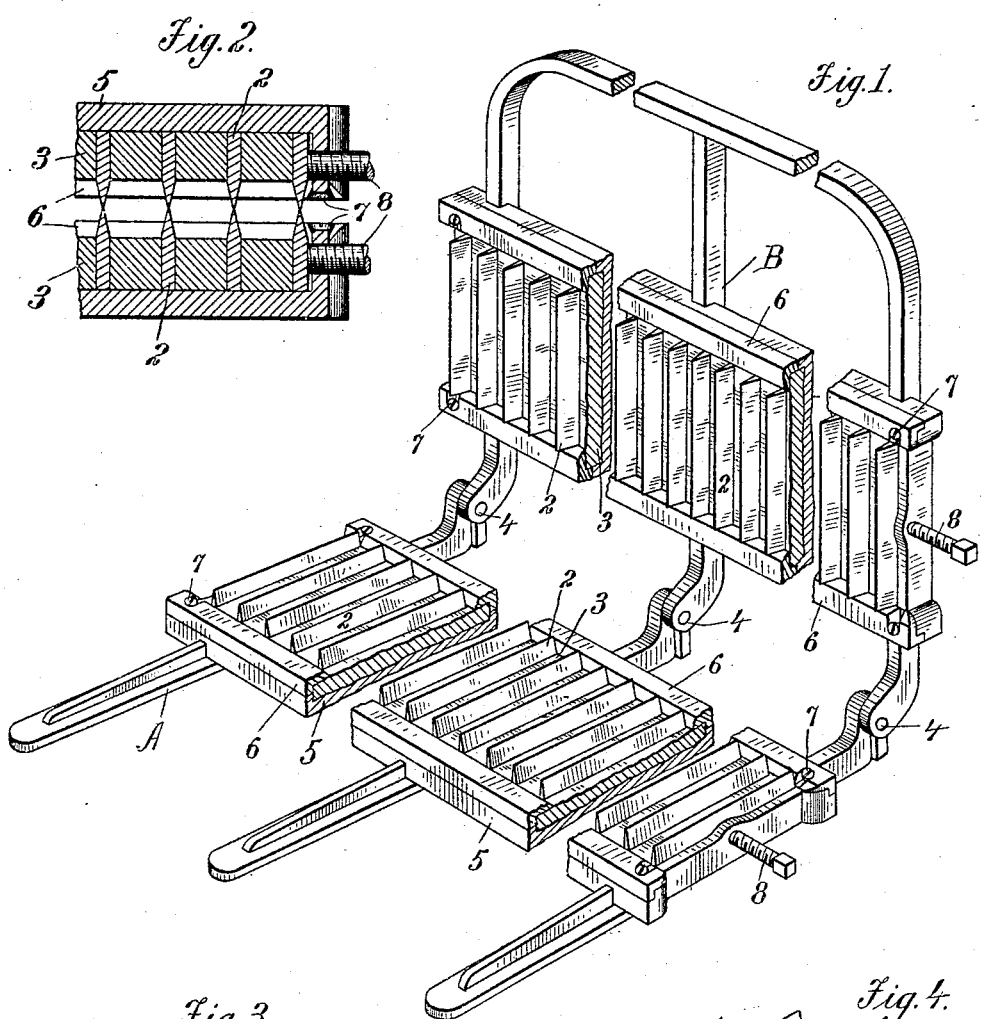
Witnesses
Alex Gurie
Charles A Enfield
Inventor
John Lindberg
by Geo. H. Strong.
Attorney

UNITED STATES PATENT OFFICE.

JOHN LINDBERG, OF SAN FRANCISCO, CALIFORNIA.

ADJUSTABLE COMBINATION CANDY-CUTTER.

No. 912,006.　　　　Specification of Letters Patent.　　　　Patented Feb. 9, 1909.

Application filed March 25, 1908. Serial No. 423,150.

*To all whom it may concern:*

Be it known that I, JOHN LINDBERG, citizen of the United States, residing at the city and county of San Francisco and State of California, have invented new and useful Improvements in Adjustable Combination Candy-Cutters, of which the following is a specification.

My invention relates to a device for cutting candy.

The object of the invention is to provide an adjustable combination candy-cutter, which shall be simple, practical, and comparatively inexpensive, which shall have means for cutting candy into any desired shape, and which will permit of a variety of adjustments and combinations, according to the shape to be given to the finished product.

The invention consists of the parts and the construction and combination of parts as hereinafter more fully described and claimed, having reference to the accompanying drawings, in which—

Figure 1 is a perspective view of the invention; Fig. 2 is a longitudinal sectional view of one end of the device; Fig. 3 is a transverse sectional view of one of the frames, and Fig. 4 is a perspective view of a modified form of spacing block.

In the practice of the invention, I employ two hinged frames A and B, both of which are ordinarily provided with a series of adjustable, removable knives 2, and spacing blocks 3. The frame A is stationary, while the frame B is hingedly connected to A, as shown at 4, whereby the two frames are adapted to open and close towards each other. Each frame has a bed-plate 5, with the front and back removable clamp-bars 6, between which the cutters 2 and spacers 3 are adjustably secured. The bed-plate is suitably channeled to provide a seat and guide-way, into which the cutters and spacers are removably received. The cutters are designed to be stood on edge, and their ends are cut away so that they may be received under the clamp-bars 6; the latter being preferably angle-shape in cross-section, so that a portion of these bars engages the cutters and spacers at the ends, as well as on top. Any form of locking devices, as the screws 7, may be employed to engage the slotted ends of the bars 6.

This cutting machine may be of any suitable length, width, shape and material.

Where the candy is to be cut into regular lengths of sofa-cushion shape, the cutters are uniformly spaced apart in both frames A and B, with the cutters in the upper frame registering with those in the bottom frame, as indicated in Fig. 2; the candy being cut to any length, depending on the width of the spacing strips 3; and each machine is provided with a variety of spacing strips and cutters, suitable for all kinds and styles of candy. If the candy is to be cut into thin squares having corrugated sides, I may use a spacing block 3', as shown in Fig. 4; and in this case I may make the cutter 2' integral with the block. If it is desired to cut candy so that one side shall be convexed and the other flat, I may simply insert a flat board or plate into the groove in the bed-plate of the stationary frame A, and arrange my cutters in the top frame so as to produce the desired result.

The various cutters and spacing members are suitably clamped in the frames by the set screws 8.

By having a suitable variety of removable, interchangeable cutters and spacers and pattern blocks 2—3—2'—3', etc., I provide a machine which has, by experience, proved very useful, handy and economical in the candy-making art.

It is possible that various changes may be made in the arrangement and proportion of the different parts of the invention, without transcending the scope of the appended claim.

Having thus described my invention, what I claim and desire to secure by Letters Patent is—

In a candy-cutter, a spacing block having a projecting end portion and an integral cutter extending along one side edge, said block having its surface fashioned to cut the candy into thin squares having corrugated sides.

In testimony whereof I have hereunto set my hand in presence of two subscribing witnesses.

JOHN LINDBERG.

Witnesses:
　　CHARLES A. BUFIELD,
　　CHAS. E. TOWNSEND.